United States Patent [19]

Guzik

[11] Patent Number: 4,496,232

[45] Date of Patent: Jan. 29, 1985

[54] APPARATUS FOR AND METHODS OF MAKING BIMODAL ELECTROPHOTOGRAPHIC COPIES

[75] Inventor: Rudolph Guzik, Chicago, Ill.

[73] Assignee: Bell & Howell, Chicago, Ill.

[21] Appl. No.: 271,154

[22] Filed: Jun. 8, 1981

Related U.S. Application Data

[62] Division of Ser. No. 110,427, Jan. 7, 1980, abandoned.

[51] Int. Cl.[3] ...................... G03G 15/00; G01D 15/06

[52] U.S. Cl. ................................ 355/3 CH; 346/160; 430/31

[58] Field of Search ............................ 346/153.1, 160; 355/3 CH; 430/31, 97, 100, 101, 103, 122

[56] References Cited

U.S. PATENT DOCUMENTS

| | | | |
|---|---|---|---|
| 2,786,439 | 3/1957 | Young | 430/122 |
| 3,455,276 | 7/1969 | Anderson | 430/122 |
| 3,563,734 | 2/1971 | Shely | 430/124 |
| 3,639,245 | 2/1972 | Nelson | 430/903 |
| 3,653,895 | 4/1972 | Brandon | 430/100 X |
| 3,816,840 | 6/1974 | Kotz | 346/153.1 |
| 3,909,258 | 9/1975 | Kotz | 430/122 |
| 4,014,291 | 3/1977 | Davis | 427/18 |
| 4,081,571 | 3/1978 | Nishihama et al. | 118/657 X |
| 4,121,931 | 10/1978 | Nelson | 118/657 X |
| 4,197,119 | 4/1980 | Sadamatsu | 355/3 CH |

*Primary Examiner*—Thomas H. Tarcza
*Attorney, Agent, or Firm*—Laff, Whitesel, Conte & Saret

[57] ABSTRACT

A bimodal electrophotographic apparatus and process which incorporates capabilities for making both positive and reversal copies. One surface of a layer of a zinc oxide coated paper, or the like, is given an initial electrostatic charge. The charged surface is then exposed to an image having light and dark areas for causing surface charge to dissipate, in varying degree depending on the amount of light striking the charged paper, in the exposure areas. A charged toner is applied to the zinc-oxide-coated paper by a magnetic brush. In the reversal mode, the brush has a bias potential. The brush is formed by an aggregation of magnetic toner particles clinging to the outside of a cylindrical sleeve while magnets inside the sleeve rotate. The toner collects on the paper to form an image depending upon where the charge is dissipated. A paper supporting shoe having an electrically insulated structure is located beneath the coated paper, with the insulation in the area where it passes adjacent the magnetic brush so that no current can pass through the toner after it is deposited onto the coated paper. Preferably, a pair of fuser rollers are electrically insulated so that when they come in contact with the surface of the coated material, after the toner is deposited thereon, they do not dissipate the image-caused charge. The fusing rollers may also be given a bias corresponding to the bias on the toner, for the same reason.

7 Claims, 9 Drawing Figures

REVERSAL

POSITIVE

REVERSAL-WEAK BINDING

ENTERING FUSER

APPARATUS FOR AND METHODS OF MAKING BIMODAL ELECTROPHOTOGRAPHIC COPIES

Figure 1:
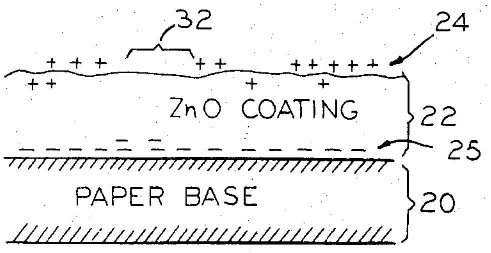

This application is a division, of application Ser. No. 110,427, filed 1/7/80, now abandoned.

This invention relates to apparatus for and methods of making bimodal electrophotographic copies and, particularly, making reverse prints on paper having a semiconductor layer thereon.

Reference is made to U.S. Pat. Nos. 3,816,840 and 3,909,258, both granted to Arthur R. Kotz. Each of these patents also cites prior art apparently known to Mr. Kotz at the time when he filed his application. The Kotz patent and the prior art cited by him include background information which might be of general interest to anyone having occasion to study this art.

Electrophotographic copies are made on paper having a semiconductor layer formed on a surface thereof. Usually that layer includes zinc oxide in a suitable binder. A bimodal form of printing makes copies having black lines on a white background responsive to originals which are either black lines on a white background ("positive" printing) or white lines on a black background ("reverse" printing). Reverse printing usually involves a photocopy made by projecting a microfilm image, since microfilm is usually a negative image.

The requirements for an application of electrophotography to microfilm reader/printers is substantially different from the comparable requirements of most business office photocopiers. One basic difference is that the projected microfilm image often has less than the minimal amount of contrast required by the response characteristics of a business office copier. Another basic difference is that the most common microfilm image is projected from a negative film having white lines on a black background. On most prints, the viewer prefers black lines against a white background. This preference requires a method of reversing the response curve of a microfilm reader/printer since most of the copier systems are positive acting.

One existing photocopy technology uses zinc oxide coatings that are negatively charged, with the reversal image being achieved by a use of liquid reversal toners. These toners have particles suspended in an inert fluid. The particles are preferentially attracted to the most positive charge level of the latent image on the surface of a light-struck sheet of zinc oxide binder paper. These positive charges occur at the areas which are first charged by a corona and then selectively discharged as a result of light from the copied image.

Another alternative photocopy technology involves a use of bichargeable zinc oxide coatings which accept either a positive or a negative surface charge. A positively charged coating presents a positive latent image charge to a liquid toner, with positively acting toner particles. Relative to the positive surface charge, this toner is preferentially attracted to the most negatively charged areas, which are the corona-illuminated and then image-discharged areas.

The major problems with these liquid toner systems include the handling and maintenance of a wet toner, drying prints, and developing a sufficient contrast in the finished prints. The usual means for enhancing contrast and modifying the minimal threshold of development involves a use of an intensifier electrode. Often, a bias voltage is applied to the toner to accelerate deposition by increasing the effective field that the suspended toner particles experience. These techniques greatly increase the density (and, therefore, the contrast) of the photocopy image and modify the response of the system. However, the results are not completely satisfactory. Furthermore, a liquid toner does not remain in suspension without frequent agitation.

Many microfilm printers are not used during long periods of time. However, a preferred system should remain in a ready state for an indefinite period of time, and be ready to deliver printed copy, without a delay for a warm-up cycle. That readiness is difficult to accomplish with liquid toner.

Because of these and other disadvantages, dry toner is greatly preferred over liquid toner, provided that reversal images can be obtained and that the system can be modified to accommodate low contrast microfilm and yet produce superior print quality. Insofar as it is known, there is no successful single component dry toner, which develops a negative surface charge. Therefore, the toner particle charge is positive and it is electrostatically attracted to a negative charge and repelled by a positive charge.

An object of the invention is to produce new and improved electrophotographic bimodal photocopies. Here, an object is to provide photocopy machines for making either positive or reversal prints, especially on zinc oxide paper, through the use of a dry toner.

A further object of the invention is to provide prints having high contrast, especially from microfilm images.

Yet another object of the invention is to provide high-quality black on white prints from white on black microfilm images.

In keeping with an aspect of the invention, these and other objects are accomplished by a bimodal electrophotographic apparatus and process which incorporates both a positive and a reversal mode of operation. One surface of a layer of a zinc oxide coated paper, or the like, is given an initial electrostatic charge. The charged surface is then exposed to an image having light and dark areas for causing the surface charge to dissipate, in varying degree depending on the amount of light striking the charged paper in the exposure areas. A charged toner is applied to the zinc oxide coated paper by a magnetic brush. In the reversal mode, the brush has a positive bias potential. The toner collects on the paper to form an image depending upon where the charge is or is not dissipated. In order to provide a substrate reference charge for reversal copies, a bias shoe having an electrically insulated support structure is located beneath the coated paper with the insulation located within the area where it passes adjacent the magnetic brush. Thereafter, the deposited toner is pressure fused onto the coated paper. The fuser rollers are electrically isolated in order to prevent any charge on the fuser roller which could dissipate the image-caused charge.

Figure 2:
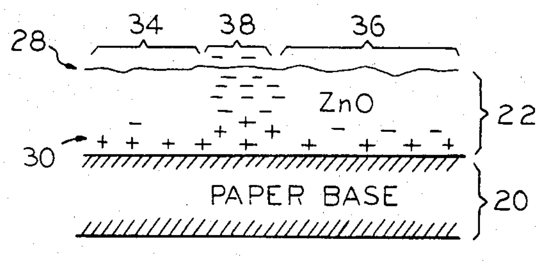
Figure 3:
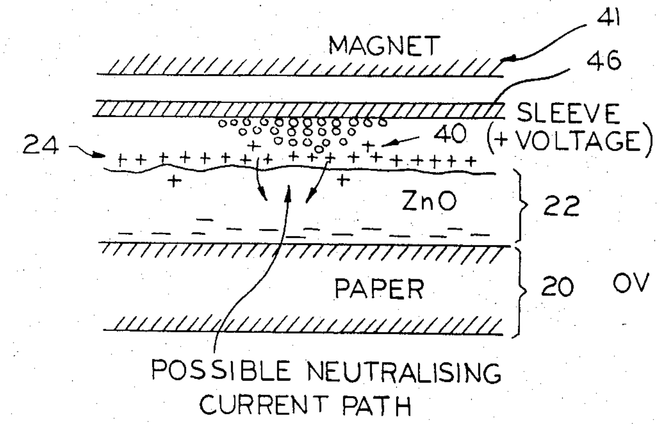
Figure 4:
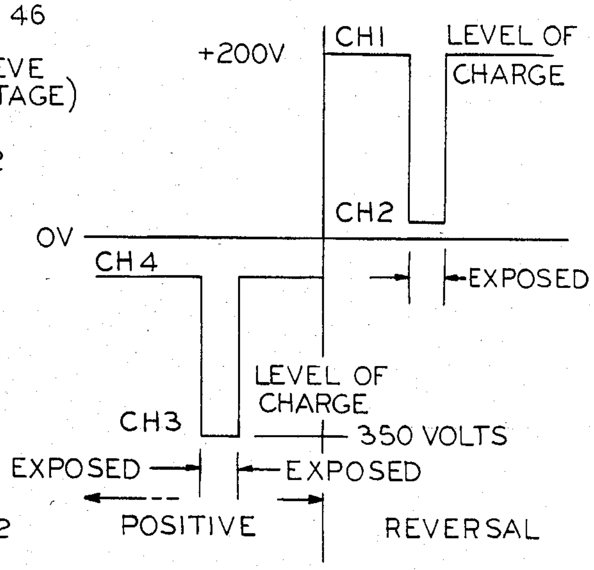
Figure 5:
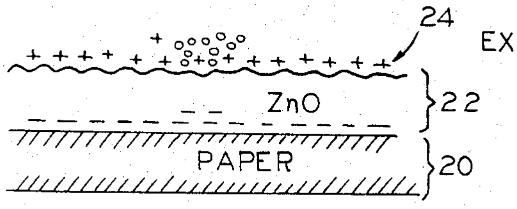
Figure 6:
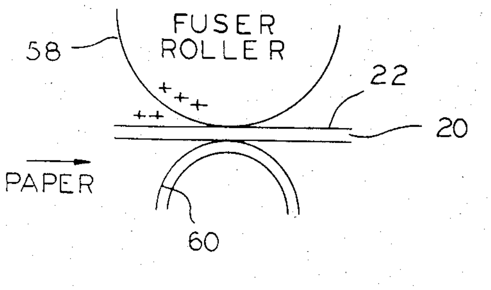
Figure 7:
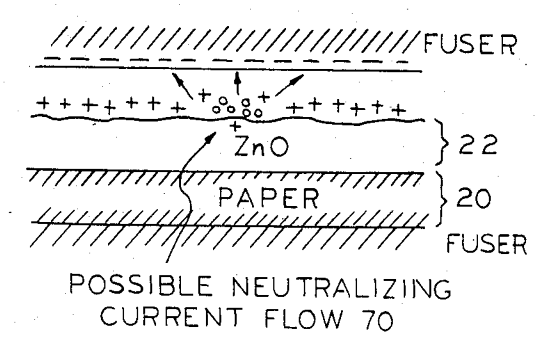
Figure 8:
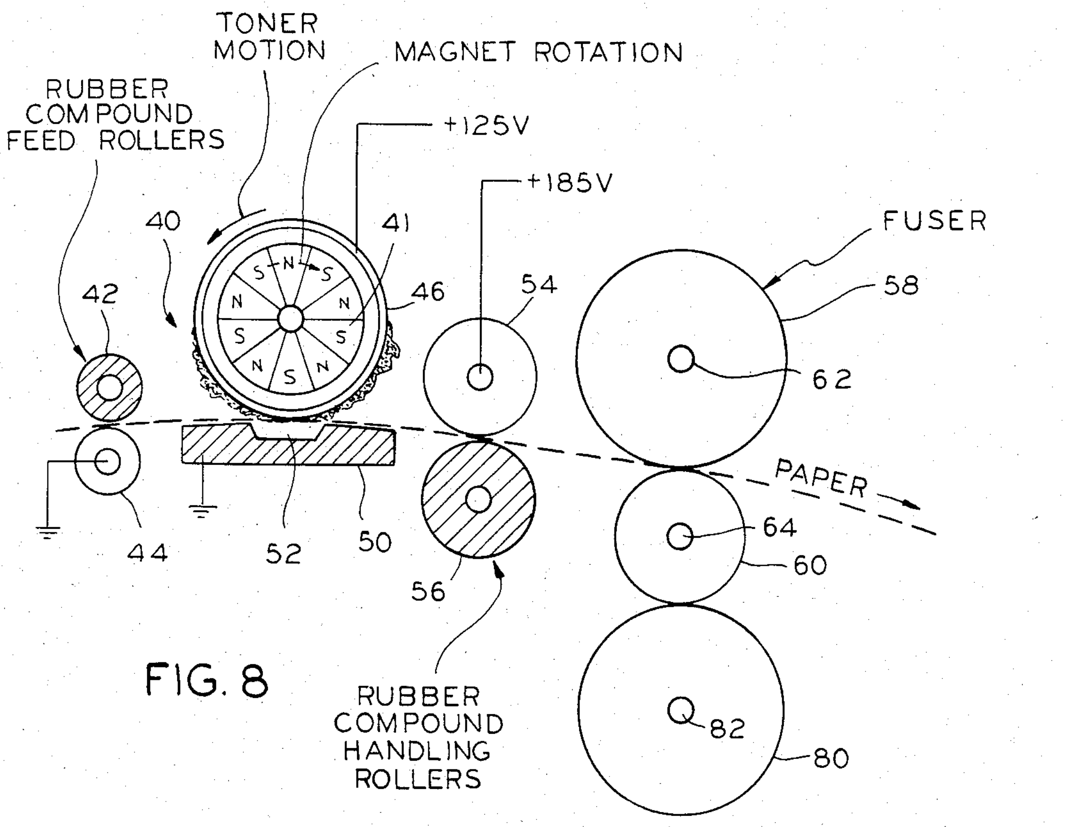
Figure 9:
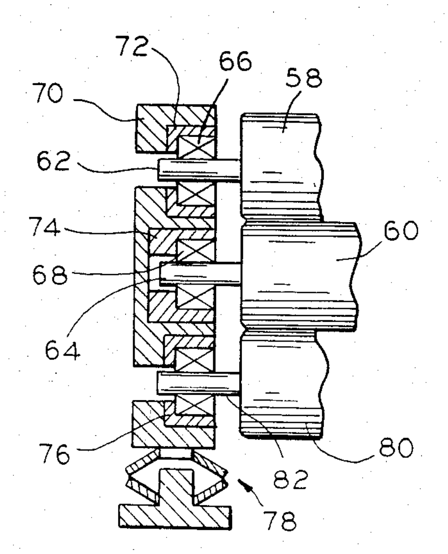

A preferred embodiment of the invention is seen in the attached drawings wherein:

FIG. 1 schematically shows paper having a zinc oxide binder layer with the charges (after exposure) used to make a reversal print;

FIG. 2 is a similar schematic showing of zinc oxide paper with the charges on exposed paper for positive printing;

FIG. 3 schematically shows the development process for a zinc oxide paper used for reversal printing;

FIG. 4 is a charge-level graph showing the relative charge levels used for positive and reversal printing;

FIG. 5 schematically shows the weak binding of reversal printing;

FIG. 6 shows the fuser roller used to fix the image in electrophotographic printing;

FIG. 7 graphically illustrates the effects of the fuser upon the current flow;

FIG. 8 schematically illustrates the apparatus used to carry out the inventive process; and FIG. 9 is a vertical cross section of the fuser roller support which shows how the bearings of the fuser rollers are electrically insulated to preclude image dissipation at the fusing step.

FIG. 1 shows a paper base or substrate 20 having a zinc oxide coating 22 bonded thereto. The coating 22 acts somewhat as a diodic body or as the insulating layer of a capacitor. For reversal printing (FIG. 1), the surface of the zinc oxide layer is exposed to a corona, and a positive charge 24 accumulates on the exposed surface of the oxide layer while a negative charge 25 is induced on the buried surface of the oxide layer, next to the paper. For positive printing (FIG. 2), the same zinc oxide coating 22 is exposed to a corona for accumulating a negative charge 28 on the exposed surface of the oxide layer while a positive charge 30 is induced on the buried surface.

The opposed charges remain in the induced or corona-attracted positions on opposite sides of the zinc oxide coating long enough to accomplish the printing. Next, an image which is to be photocopied is projected on to the corona-charged surface. The light of that image causes the opposed charges 24,25 (i.e., on the upper and the buried layers) to recombine. Thus, in the reversal mode of FIG. 1, it is assumed that the light of a projected image strikes the surface in the area 32. The remainder of the surface is shielded against the light by black areas in the projected image. Therefore, the corona charge disappears from the oxide surface, but only in the area 32 where the light of the image caused a recombination of charges.

In FIG. 2, the light of the projected image strikes the corona-charged areas 34,36 causing the surface charge 28 to recombine with charge 30 on the opposite or buried side of the oxide layer. The residual corona 28 charge remaining on the oxide surface, in area 38, was shielded from light by a black area in the image.

FIG. 4 shows the voltage levels of the various charges on the outer surface of the zinc-oxide layer. The positive voltage charge levels (right side of FIG. 4) are used in reversal printing and the negative voltage charge levels (left side) are used in positive printing. The same positively charged toner particles are used in both modes. For reversal printing, the positive toner particles are repelled by the positive corona-caused surface charges CH1 (FIG. 4) in the dark image areas and forced by such repulsion into the light-struck area 32. The high positive corona-caused charge CH1 and the light- or exposure-caused low charge CH2 is shown by the voltage level curve seen on the right side of FIG. 4. For positive printing, the positively charged toner particles are attracted by the high negative charge CH3 in the area 38 which was exposed to the light of the image. As seen on the left side of FIG. 4, negative potential is in the area which is shielded from the light by the black areas of the image.

Electrostatic copiers of the described type, which use zinc oxide paper and dry single-component toner, specifically require a pressure-fusable, magnetic toner. (Selenium drum copiers generally use a dual component toner.) Such a single component toner uses particles having a ferromagnetic core with an overcoat including a pigment and pressure-fusable resins.

These particles, shown at 40 (FIG. 3), are attracted to each other by their own magnetic charge. This self attraction forms the particles into an extended brush of toner fibers that are built up along magnetic field lines extending between adjacent poles of a longitudinally polarized cylindrical magnet 41 (FIG. 8). The toner is actually deposited on the outside of a non-magnetic (brass, for example) sleeve or shell 46, while the magnetic cylinder 41 rotates inside the sleeve 46, moving the brush 40 of toner particles to continuously dispense fresh toner and to maintain a relatively uniform brush height. Furthermore, by a process of tumbling the particles around the periphery of sleeve 46, the toner particles take on a positive triboelectric charge, to a charge level of which is determined by the particle's resin overcoat and the overall particle conductivity.

The photoconductive, zinc-oxide-coated papers used in electrostatic copiers preferentially accept a negative surface. When the projected image falls on the charged surface, the illuminated zinc oxide crystals become conductive and the surface charge is dissipated by a recombination of charges within the light-struck areas. The non-illuminated crystals remain resistive and the surface charge in these areas is retained. The positively charged toner is attracted to the negative surface charge on the coated paper. If the force of electrostatic attraction is greater than the magnetic force holding the toner particles in the magnetically brush fibers, the particles are deposited on the paper surface (FIG. 5).

The induced electrostatic attraction holds the toner particles in place until they are fused by rolling into the nip of pressure rollers 58,60 (FIG. 6). The particles are then, in part, embedded in the zinc oxide coating 22 and bonded thereto by the resin which flows into the paper coating and into adjacent resin layers coating other toner particles. If the background area of the image to be printed is fully illuminated, the information areas are left at various charge levels (seen in FIG. 4) depending on the relative level of light exposure levels. The resulting developed image density depends on the photo response of the photoconductive coating, the resulting latent charge image, and the characteristic response of toner deposition.

There is a minimum threshold of surface charge 24 in reversal printing (FIGS. 1, 3, 5) that is able to repel toner or of surface charge 38 in positive printing that is able to attract toner. These threshold charge differentials are the minimum differential tones that may be seen as differences in image density on the photocopy. For most copiers, the preferred resultant characteristic curve is a high-contrast curve, or contrast-enhancing curve, in which there is a steep relationship between illumination and developed density. This high-contrast curve is preferred because a shallow characteristic curve requires a modification of the zinc oxide coating that makes the surface more conductive. That enhanced conductivity results in a lower maximum charge acceptance and, consequently, a lower-developed maximum density. Prints which appear to have high contrast (this is, more black and white and less gray) are more legible and are preferred by copier users.

For the dry toner process to make black on white prints from white on black microfilm images, a copier requires means for causing the positively-charged particles to be deposited in the illuminated and discharged areas of the latent image on the charged surface of the zinc oxide paper. Furthermore, it is also necessary to find some means for increasing the grey scale sensitivity of the system without losing the saturation density. Unless these and other features are appropriately determined, the system does not produce prints which are as acceptable as they could be. Furthermore, the system would be unstable and unreliable if the conditions are only approximately correct.

The characteristics included in the overall process which enables a performance in either positive or reversal mode are the following:

1. A bias voltage of positive polarity is determined by the charge acceptance of the photoconductor and the background potential of the illuminated photoconductive sheet.

2. An insulative element prevents current flow and neutralizes the weak electrostatic forces binding the toner during the period while the toner is subjected to the scavenging magnetic field of the brush.

3. The current flow through the sheet is controlled during fusing in order to prevent a neutralization of the electrostatic binding of the toner, which may include control of the substrate volume conductivity.

4. Lateral conduction through the sheet is controlled to prevent current flow between development and fusing fields.

5. The position of the toner brush is controlled relative to the latent charge image surface which is to be developed in order to control the effective electrostatic separation force.

6. The photoconductive and deposition parameters are controlled to maximize the grey scale and latitude of the imaging process.

7. The lateral conductivity on the substrate is controlled to enable capacitive intensification of the latent image fields during development of large image areas.

8. The thickness and formulation of the photoconductive coating is controlled to reduce field breakdown that accounts for background speckling and to enable the best charging and recombination characteristics to be maintained.

9. The triboelectric charge of the toner particles, particle resistivity, and magnetic susceptibility are controlled, i.e., the charge which the toner particles pick up as they are agitated or magnetically stirred.

10. Operational parameters are selected, such as: magnet rotation speed, paper linear speed, magnetic strength, fuser pressure, paper tension, electrostatic isolation, and paper characteristics such as stiffness, and moisture absorption.

The apparatus for carrying out the invention is best seen in FIG. 8, where the path followed by the paper is shown by heavily inked, dashed lines. The path begins at the nip of a pair of feed rollers 42,44, one of which (42) may be made from a rubber compound. The lower of the feed rollers 44 is conductive and standing at a ground charge in order to give the paper substrate an initially neutral or zero level charge.

After it leaves the feed rollers 42,44, the paper encounters a stationary, non-magnetic sleeve 46 surrounding a rotating magnetic member 41. The sleeve has a high positive charge (+125 V) to give the toner or ink particles a high positive charge. The particles outside the sleeve cling together and form a brush as the internal magnetic member 41 rotates within the sleeve 46.

According to the invention, the opposite side of the paper passes over an undercut shoe 50 which is held at ground potential. The undercut area of the shoe forms an insulating air gap which is opposite the location where the magnetic brush encounters the charged surface. Therefore, this insulation prevents a substrate charge which could adversely disperse the toner, away from the toner area.

After the paper leaves the region where the toner particles are deposited on the charged zinc oxide binder coating, it is fed through the nip of paper handling rollers 54,56. The lower of these rollers (56) is a rubber compound. The upper roller 54, which encounters the charged particles is conductive and biased to +185 V, which is a bias that augments the bias applied to the sleeve 46. Thus, there is no image-disruptive potential which attracts the toner particles onto the roller 54.

After it leaves the paper-handling rollers 54,56, the paper enters a nip of fuser rollers 58,60. Here, the particles are squeezed together and pressed against the paper so that the ink of the toner is fused into the zinc-oxide-coated surface of the paper.

According to the invention, it is important that the fuser rollers do not have a charge which could either pick up or relocate the toner. Therefore, the bearings for supporting the fuser rollers are electrically insulated, as seen in FIG. 9. More particularly, each of the rollers 58,60 is mounted on a suitable axle 62,64 which is supported, as seen in FIG. 9. The axle turns in bearings 66,68 which are supported by a frame 70 made of any suitable material such as steel, for example. The third roller 80, mounted on axle 82, provides a support for the center of roller 60, in order to keep it from bending slightly when it is in use. Interposed between the steel frame and the bearings 66,68 are plastic inserts 72,74,76 which electrically insulate the rollers from the frame. A number of conical springs 78 provide shock-mounting support for frame 70.

The conductive sleeve 46 is used in order to apply a bias field to the toner. The bias is required for reversal development, but not for positive development (i.e., reversal converts white on black images to black on white prints). In positive development, the latent charge image is negative against a neutral background, as seen in FIG. 4. Equal density is achieved with either a conductive or non-conductive sleeve supporting the toner. If a positive bias voltage is applied to sleeve 46, when in the positive development mode, the image may be overdeveloped and the background may become filled in. If a negative bias voltage is applied to sleeve 46, when in the positive development mode, the image density is decreased, and if the negative bias is a sufficiently high potential, all development is restrained. For reversal development, where the latent image is neutral against a background of a positive charge, no development occurs unless the bias voltage is greater than 80 volts. With increasing positive bias voltage, the imag density increases until the background is filled in.

Reversal development can occur using a conductive sleeve with a dielectric overcoat. However, as the photoconductive sheet is passed below the sleeve, the dielectric surface acquires as induced negative surface charge, which tends to reduce deposition density as the sheet is processed. Deposition density returns if some time is allowed for the dielectric to return to the bias potential at its surface.

It is not necessary to provide a reference electrode behind the sheet during development since the paper itself creates the potential difference between the zinc oxide binder layer and the toner particles. A reversal image can be developed by lightly moving the unsupported paper, in a grazing contact, over the brush. A reversal image can be developed across a clear air gap if a sufficient bias voltage is applied, even when the image is granular and uneven.

The principles of operation depend on the triboelectric charge imparted to the toner particles responsive to their agitation. Although the particles are sufficiently conductive to pass current, the degree of conductivity in the brush depends upon its compression. Normal conditions include forces of magnetic attraction and grazing contact with an electrode, during which the total resistance of the toner brush is about 800 K ohms. The resistivity of the toner is about $2.5\times10^8$ ohms/cm, in the surface dimensions and cross section; therefore, it is clearly a non-conductive medium. Under nominal compression, this resistivity can be reduced to about $2\times10^4$ ohms/cm which may be considered conductive. Although the toner is positively charged responsive to friction caused by the magnet rotation (i.e., the triboelectric charge) that charge can be neutralized if the toner is compressed and the deposition does not occur. The degree of particle charge can be measured in comparison to induced electrostatic fields. However, measurements of absolute values require refined techniques such as those described in "Electric Field Detachment of Toner" by D. A. Hays.

Since the core of the toner particle is ferromagnetic, the toner particles behave as miniature magnets. The force required to detach the toner is dependent on the inverse square of the distance between a charge and the magnet. The electrostatic force of attraction, which is responsible for toner separation, is also dependent on the inverse square of the distance from the particle to the latent charge of the image. Therefore, the distance between the toner brush and the latent charge is critical, especially in the reversal development mode, since the surface charge is generally weaker for reversal.

With close contact, as where there is some compression within the brush, the particle charge is reduced because the resistivity of the brush is decreased. The toner is brought closer to the magnet, and the magnetic forces dominate and deposition is greatly reduced. With a clear separation between the brush and the charge image, the electrostatic force of attraction is too weak to cause toner separation and no deposition occurs.

The applied bias can be increased by several hundred volts and the increased electric field can recover some image deposition, but this means of extending the distance range does not result in acceptable print quality. Using the point at which the brush makes a grazing contact with the paper surface, the effective deposition range is within 0.2 mm (0.008") in either direction, with acceptable prints restricted to half that range. Therefore, it is important to control the position of the paper surface relative to the brush. By moving the paper surface inwardly toward the brush, the unwanted gray tone background is gradually increased. When the electrostatic forces dominate, abruptly no deposition occurs. By moving the paper surface outwardly from the brush, the image gradually becomes weaker and more granular because only the strongest fields are effective. Finally, when the paper is far enough from the brush, all of the toner deposition ceases. For operating in the positive mode, the effective deposition range is more than twice as great and the position of the paper surface could not be considered critical by comparison.

By using a bimode ZnO formulation, with unequal charge acceptance, this type of paper accepts a negative charge which may be greater than 300 volts. However, it cannot accept a positive charge which is as high as 200 volts. Assuming a residual voltage of about 20 volts after illumination, the voltage differential in the positive mode is greater than 280 volts but, in the reversal mode, the differential is less than 180 volts. In the positive mode, the image is formed with a negative charge against a relatively neutral background and the positively charged particles are attracted directly to the image where they are strongly bound. In the reversal mode, the image is formed with a relatively neutral voltage against a positive background charge.

The bias is applied via the supportive sleeve 46 which elevates the potential of the toner particles to the level CH1 (FIG. 4) of the background charge. Then, the neutral areas are effectively made negative. Although good deposition occurs, the electrostatic binding forces are substantially weaker for the reversal mode than for the positive mode since the charge differential is smaller. Thus, the reversal process is considerably more sensitive.

In order to provide good control over the position of the paper surface, the inventive support shoe 50 is placed under the brush. The paper is pulled over the surface of shoe 50 and through the nip of rollers 54,56, which maintains a tension in the sheet of paper. The natural curl and stiffness of the sheet conforms to the curve of the shoe. An alternative technique may include a vacuum platen transport positioned below the brush. A grazing contact between the paper and the brush is controlled by the weight of a paper positioned above the brush. In this alternative, the image is developed upside down.

In the positive mode, the shoe 50 is not required to apply a bias. Therefore, no field is impressed across the paper thickness. Furthermore, the image charge is retained on the relatively non-conductive areas of the coating.

When using a bias on the support shoe 50, a current flow to the biased toner brush 40 or sleeve 46 prevents development in reversal printing. This brush current is not a problem in the development during copying in the positive mode.

More particularly, in the reversal mode, the image is formed by the illuminated areas at charge CH2 (FIG. 4), which areas have a conductivity that is several orders of magnitude greater than the conductivity of the background areas, which are positively charged at the level CH1. In order to elevate the potential of the toner particles in the reversal mode, the applied positive potential creates a field across the thickness of the sheet of paper, if the back of that sheet is in contact with the conductive shoe 50, biased at ground potential. An electron current 70 (FIG. 7) might then flow upwardly through the paper and the relatively conductive image areas, thereby neutralizing the charge on the toner. If this current occurs, the magnetic brush would then reclaim the tone particles which were previously laid down on the sheet.

Accordingly, in the reversal mode, it is necessary to prevent such a current flow 70, responsive to the bias potential applied through the shoe 50. It is possible for the shoe to include an insulator such as glass or a dielectric coating. Also, preferably, the paper base stock has a high resistivity, which exceeds $2\times10^{12}$ ohms/cm (measured with 100 volts applied at 50% using a Keithley Resistivity Adaptor). These solutions to the problem are not always satisfactory.

The problem created by the current flow 70 is best solved by the inventive undercut region 52 on support shoe 50, which provides an air insulator below the paper and in the development zone. This shoe configuration avoids the introduction of induced electrostatic fields which could be caused by dielectric insulators. Also, the undercutting is far less expensive than using other and more exotic materials.

In the development zone, the sheet makes a grazing contact with the brush and it is supported by only its own stiffness until the sheet is grasped in the nip of the following rollers 54,56 whereupon a light tension is applied to the paper. The undercut support shoe prevents current flow through area 52 during development, even though the toner support sleeve is conductive.

At the pressure fuser 58, if there is an intimate contact between a conductive roller and the induced field of the paper, caused by the surfaces charge of the image background, the toner scatters, thereby greatly reducing the clarity of the image. Also, the fuser roller could pick up toner and then lay it down again to give a ghost image. The toner scatter problem is normally found in only the reversal mode since it results from the weak electrostatic forces binding the toner to the paper. The high positive surfaces charge CH1 (FIG. 4) of the background areas of the image induces a local negative charge on the roller 58 facing the toner. Furthermore, there is a strong field across the paper and a current 70 flows upwardly (FIG. 7) through the thickness of the sheet, which helps to neutralize the binding force acting on the toner.

A result of the uncontrolled charges is that the toner experiences some self-repulsive forces since the particles are positively charged. Also, it experiences a local negative charge attraction to the fusing roller. Simultaneously, the binding forces are neutralized through the back of the sheet. The toner explodes upwardly onto the fusing roll from which it is redeposited and fused in a scattered array around the originally developed image area. These problems do not occur if the paper base stock has a volume resistivity which is greater than $2\times10^{12}$ ohms/cm. However, this solution introduces other problems including poor deposition in large image areas.

According to the invention, the electrical isolation of the fusing roller prevents current through the paper and suppresses the locally induced negative charge on the fusing roller. A further restraint is that the lateral resistivity of the paper cannot be less than $1.5\times10^{10}$ ohms/-square (as measured with the Keithley Resistivity Adaptor). Otherwise, any voltage effect at the fuser reduces the effect of the bias applied in the development zone. The sheet assumes a higher voltage overall and the deposition is weakened.

An alternative structure uses a ceramic coating on the backing roll with a resistivity of $10^{12}$ ohms/cm for a 0.1 mm (0.004") thickness. The bias applied onto the facing roller is equal to the development bias or greater.

Before development, the sheet of paper may be handled with a roller set 42,44 comprises of a rubber compound (approximately $10^{12}$ ohms/cm resistivity) on a steel shaft backed by a conductive roller. These rollers handle charged sheets of zinc oxide paper without disturbing the surface charge. After development, the toned sheets may be handled by a steel roller 54 facing a roller 56 backed by a rubber compound roller of at least $10^{12}$ ohms/cm resistivity. The steel roller 54 must be biased with a positive voltage equal to or greater (here +185 V) than the development bias (here +125 V) when the system is used in the reversal mode. In the positive mode, the roller pair 54,56 need only be insulated from the ground.

Several factors increase deposition density and affect the sensitivity of the system in order to improve low-contrast images. The triboelectric charge of the toner particles is increased with greater mechanical agitation. With the paper development speed at about 5 inches/-sec. (12 cm/sec.), an increase of the rotation speed of the magnet 41 results in an increased density, up to 800 rev./minute. This increased density apparently corresponds to the maximum triboelectric charge on the toner. Acceptable prints may be obtained at 400 rpm, but nominal operating speed is chosen at 600 rpm, in one embodiment. As the linear speed of the paper is decreased, the deposition density is increased. Acceptable prints may be obtained up to 10 inches per second (25 cm/sec.), but nominal operating speeds are preferably between 5 and 7 inches per second.

Increasing the bias in the reversal mode increases both the developed density and the resolution of the lower contrast images. However, as the bias is increased, the background begins to be developed, as well. The images are clearly overdeveloped, giving an appearance of being overexposed. The preferred range is 120 volts to 160 volts with the exact level being selected to match the general type of imagery which is to be printed.

An alternative embodiment would apply a bias potential to fuser roller 58 much as a bias potential is applied to the pickup roller 54. This bias potential is comparable to the bias applied to sleeve 46 and roller 54. It may be in the order of +125 to +185 volts in this example.

Those who are skilled in the art will readily perceive how to modify the system. Therefore, the appended claims are to be construed to cover all equivalent structures which fall within the true scope and spirit of the invention.

I claim:

1. A bimodal electrophotographic imaging reader/-printer for reading and printing either black on white or white on black original documents, with the printing always being black on white copy, whereby said reader/printer may operate in either a positive or a reversal mode of operation, said reader/printer comprising:

means for selectively applying a positive bias for a reversal mode of printout interchangeably with a removal of said bias for a positive mode of operation;

means responsive to a selection of the positive mode of operating for applying a negative electrostatic charge to one surface of a layer of a coated material, means for exposing the negatively charged surface to an image having light and dark areas for causing the negative surface charge to dissipate in varying degrees depending on the amount of light in the exposed image areas, magnetic brush means with said bias removed for applying a positively charged toner to said exposed image area;

means responsive to a selection of the reversal mode of operating for applying a positive electrostatic charge to one surface of a layer of a coated material, means for exposing the positively charged surface to an image having light and dark areas for causing the positive surface charge to dissipate in varying degree depending on the amount of light in the exposed image areas, magnetic brush means having said positive bias applied thereto for applying said positively charged toner to said exposed image area; and means for fusing the deposited toner onto the coated material in both of said modes of operation.

2. The reader/printer of claim 1 wherein the means for fusing comprises a positively biased fuser roller which comes in contact with the surface of the coated material on which the toner is deposited.

3. The reader/printer of claim 2 wherein the means for fusing comprises a pair of fuser rollers which come in contact with the surface of the coated material on which the toner is deposited.

4. The reader/printer of claim 1 or 2 or 3 wherein the coated material is a paper having a zinc oxide layer on one side thereof, the means for fusing comprises at least two fusing rollers forming a nip through which said coated material passes, the first fusing roller contacting the surface of the coated material on which the toner is deposited, and at least the second fusing roller being electrically isolated and positioned to encounter the uncoated side of the paper.

5. The apparatus of claim 4 wherein the first and second fuser rollers are electrically isolated from each other.

6. A bimodal electrographical printing apparatus for interchangeably making positive prints from either positive or negative original documents, said apparatus comprising means for always applying the same toner with a selectably applied electrical bias on to a printing medium having a surface charge which is distributed according to a desired image, said bias having a polarity which is selected according to whether the originals are positive or negative, documents, whereby the same biased toner is either attracted or repelled by said charges depending upon whether the original is positive or negative in order to distribute said toner in the form of said image, insulated means for mechanically supporting the underside of said medium while electrically precluding a current through said medium, and means for squeezing said toner into said surface for fusing it into said image.

7. The apparatus of claim 6 wherein said squeezing means is a pair of electrically insulated rollers.

* * * * *